8 Sheets—Sheet 1.

L. MILLER.

GRAIN BINDING HARVESTER.

No. 11,064. Reissued Mar 4, 1890.

WITNESSES,
Frank L. Durand.
Rev. M. Smith

INVENTOR
Lewis Miller
by Sell & Smith
Attorney

N. PETERS, Photo-Lithographer, Washington, D. C.

8 Sheets—Sheet 2.

L. MILLER.

GRAIN BINDING HARVESTER.

No. 11,064. Reissued Mar. 4, 1890.

WITNESSES
Franck L. Ouvande
Rex. M. Smith.

INVENTOR
Lewis Miller
by A. H. Smith
Attorney

N. PETERS, Photo-Lithographer, Washington, D. C.

L. MILLER.

GRAIN BINDING HARVESTER.

No. 11,064. Reissued Mar. 4, 1890.

WITNESSES
Franck L. Ourgud
Rex. M. Smith

INVENTOR
Lewis Miller
by A. L. Smith
Attorney

N. PETERS, Photo-Lithographer, Washington, D. C.

L. MILLER.

GRAIN BINDING HARVESTER.

No. 11,064. Reissued Mar. 4, 1890.

WITNESSES
Franck L. Ourande
Ed. M. Smith.

INVENTOR
Lewis Miller
by A. L. Smith
Attorney

N. PETERS, Photo-Lithographer, Washington, D. C.

L. MILLER.

GRAIN BINDING HARVESTER.

No. 11,064. Reissued Mar. 4, 1890.

WITNESSES
Franck L. Durand
Rex. M. Smith

INVENTOR
Lewis Miller
by A. M. Smith
Attorney

N. PETERS. Photo-Lithographer, Washington, D. C.

L. MILLER.

GRAIN BINDING HARVESTER.

No. 11,064. Reissued Mar. 4, 1890.

WITNESSES
Franck L. Durand
Rich. R. Smith

INVENTOR
Lewis Miller
by Mill Smith
Attorney

N. PETERS, Photo-Lithographer, Washington, D. C.

L. MILLER.

GRAIN BINDING HARVESTER.

No. 11,064. Reissued Mar. 4, 1890.

WITNESSES

F. L. Ourand

Rex M. Smith.

INVENTOR

Lewis Miller by A. L. Smith

Attorney

N. PETERS, Photo-Lithographer, Washington, D. C.

L. MILLER.
GRAIN BINDING HARVESTER.
No. 11,064. Reissued Mar. 4, 1890.
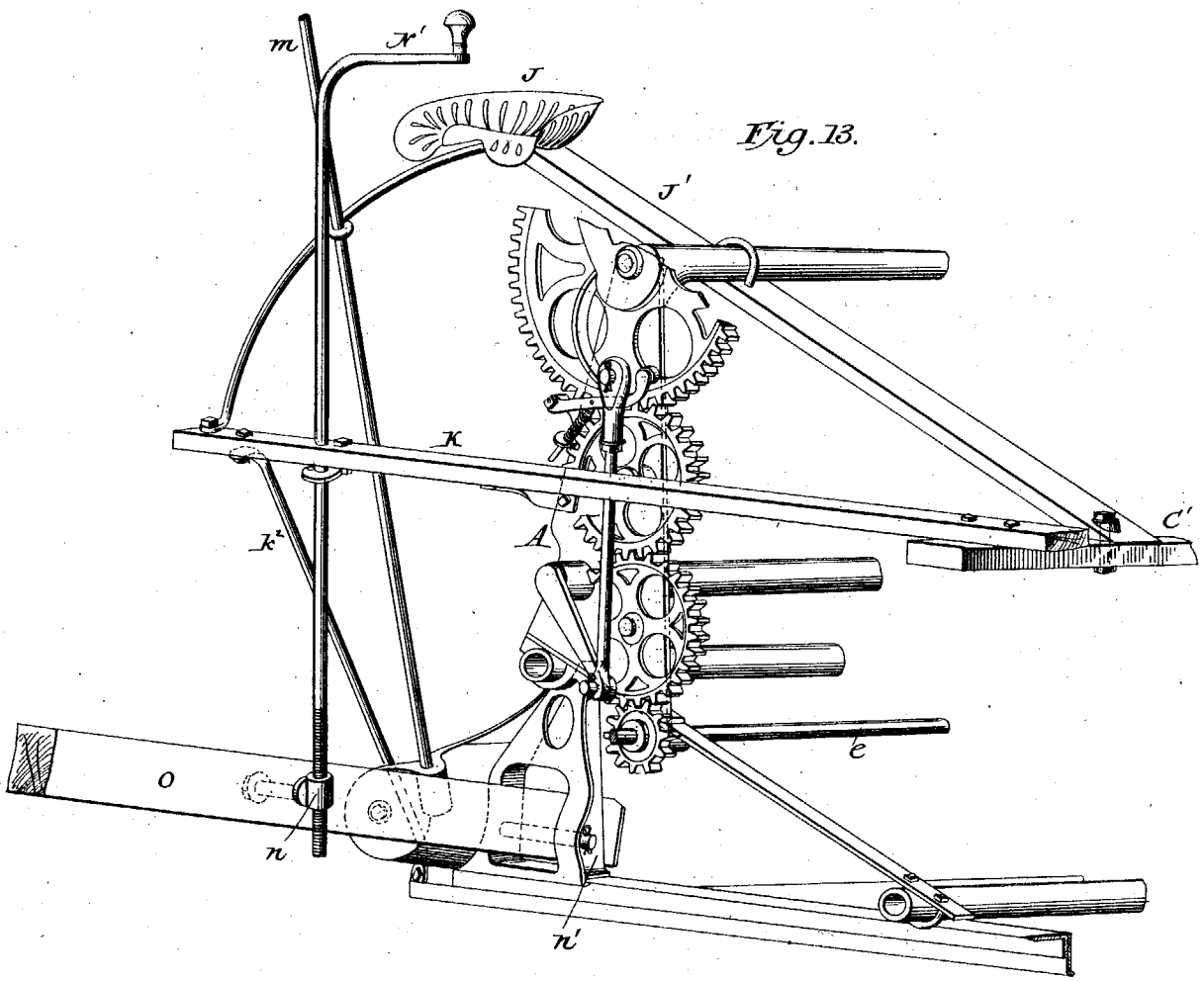
Witnesses
Sidney P. Hollingsworth
Inventor
LEWIS MILLER
By his Attorneys
Baldwin, Wanderm & Wright
N. PETERS, Photo-Lithographer, Washington, D. C.

UNITED STATES PATENT OFFICE.

LEWIS MILLER, OF AKRON, OHIO.

GRAIN-BINDING HARVESTER.

SPECIFICATION forming part of Reissued Letters Patent No. 11,064, dated March 4, 1890.

Original No. 276,448, dated April 24, 1883. Application for reissue filed April 21, 1884. Serial No. 128,759.

*To all whom it may concern:*

Be it known that I, LEWIS MILLER, a citizen of the United States, and a resident of Akron, in the county of Summit and State of Ohio, have invented certain new and useful Improvements in Grain-Binding Harvesters, of which the following is a full, clear, and exact description, reference being had to the accompanying drawings, making part of this specification, in which—

Figure 1:
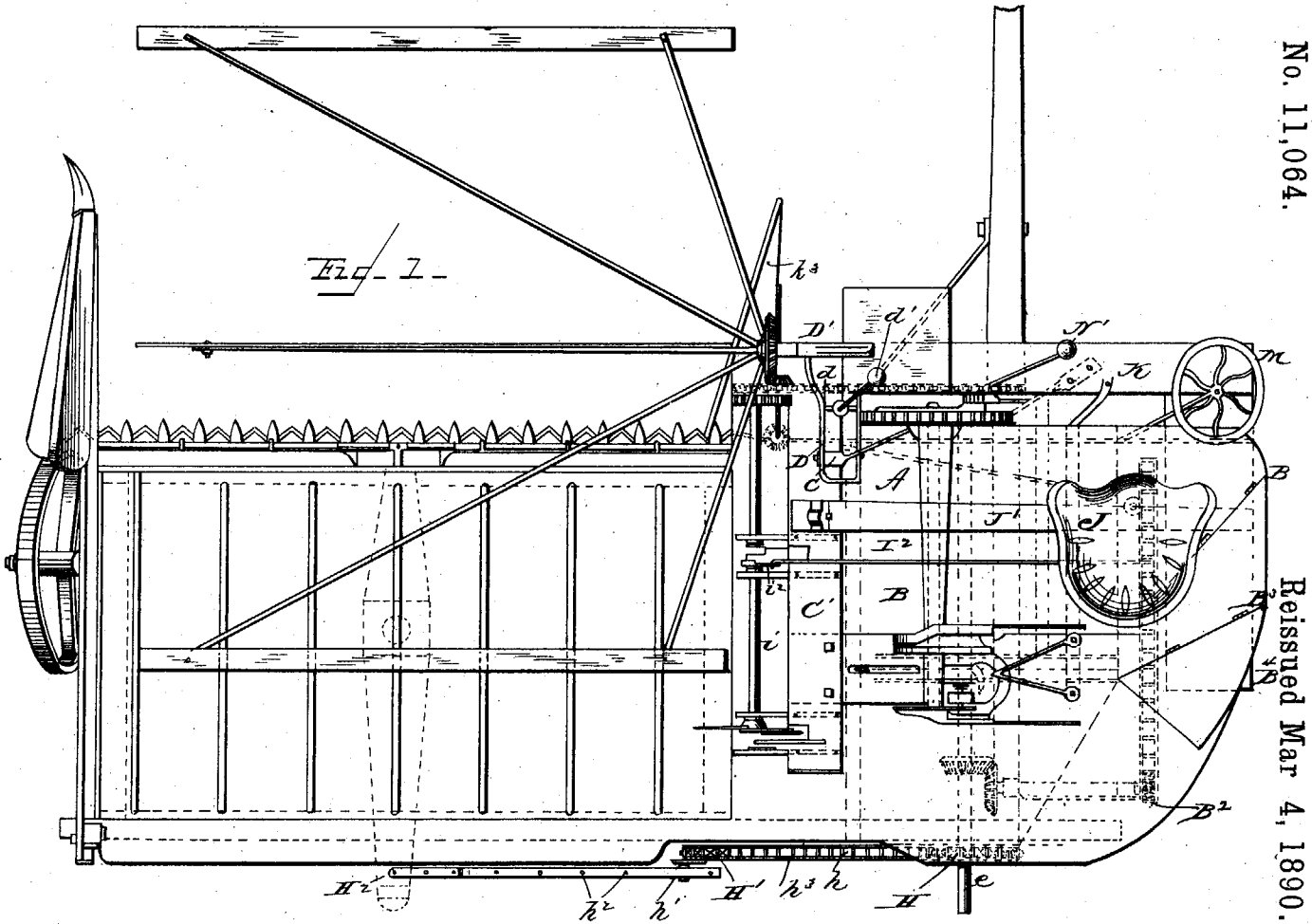
Figure 2:
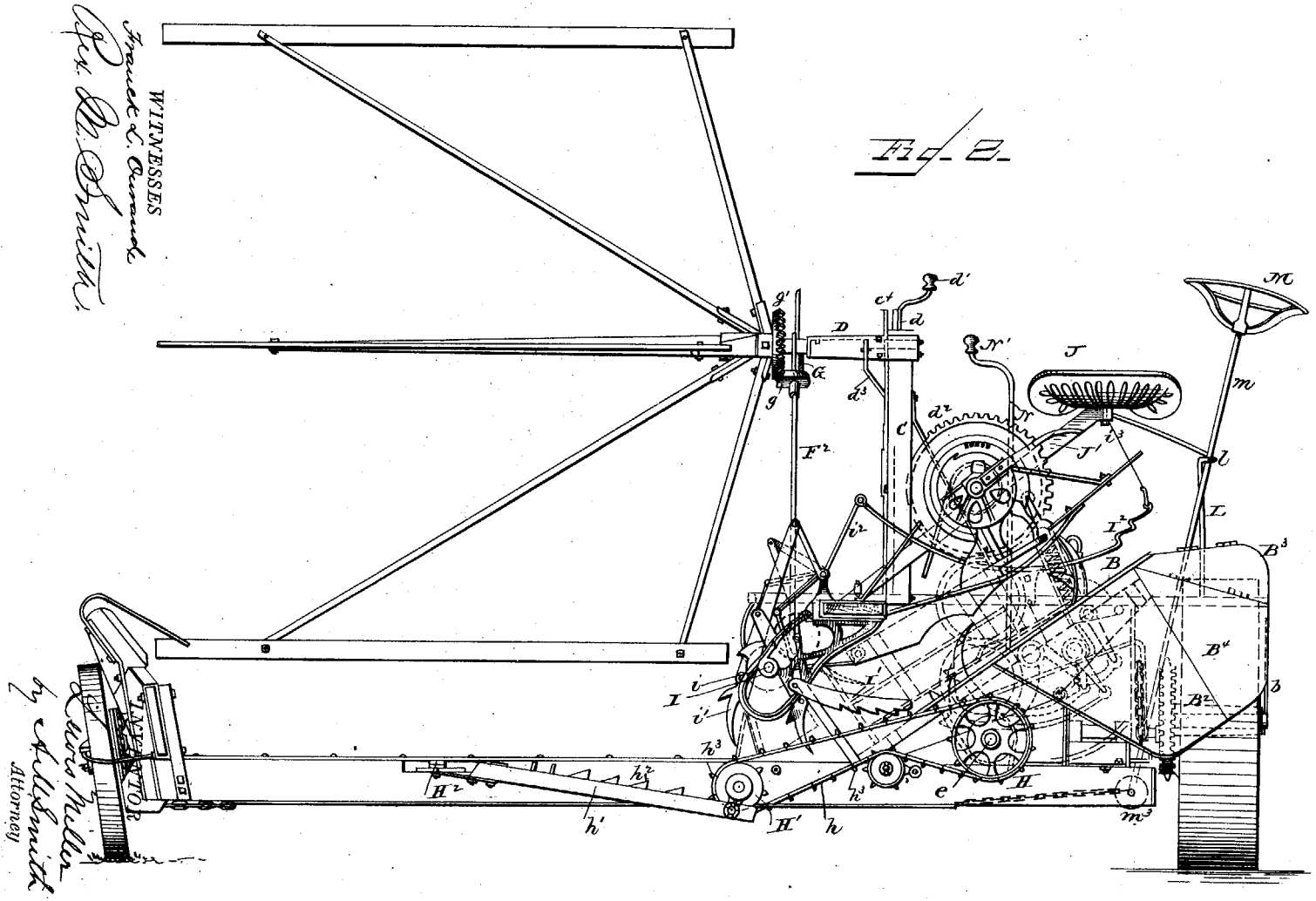
Figure 7:
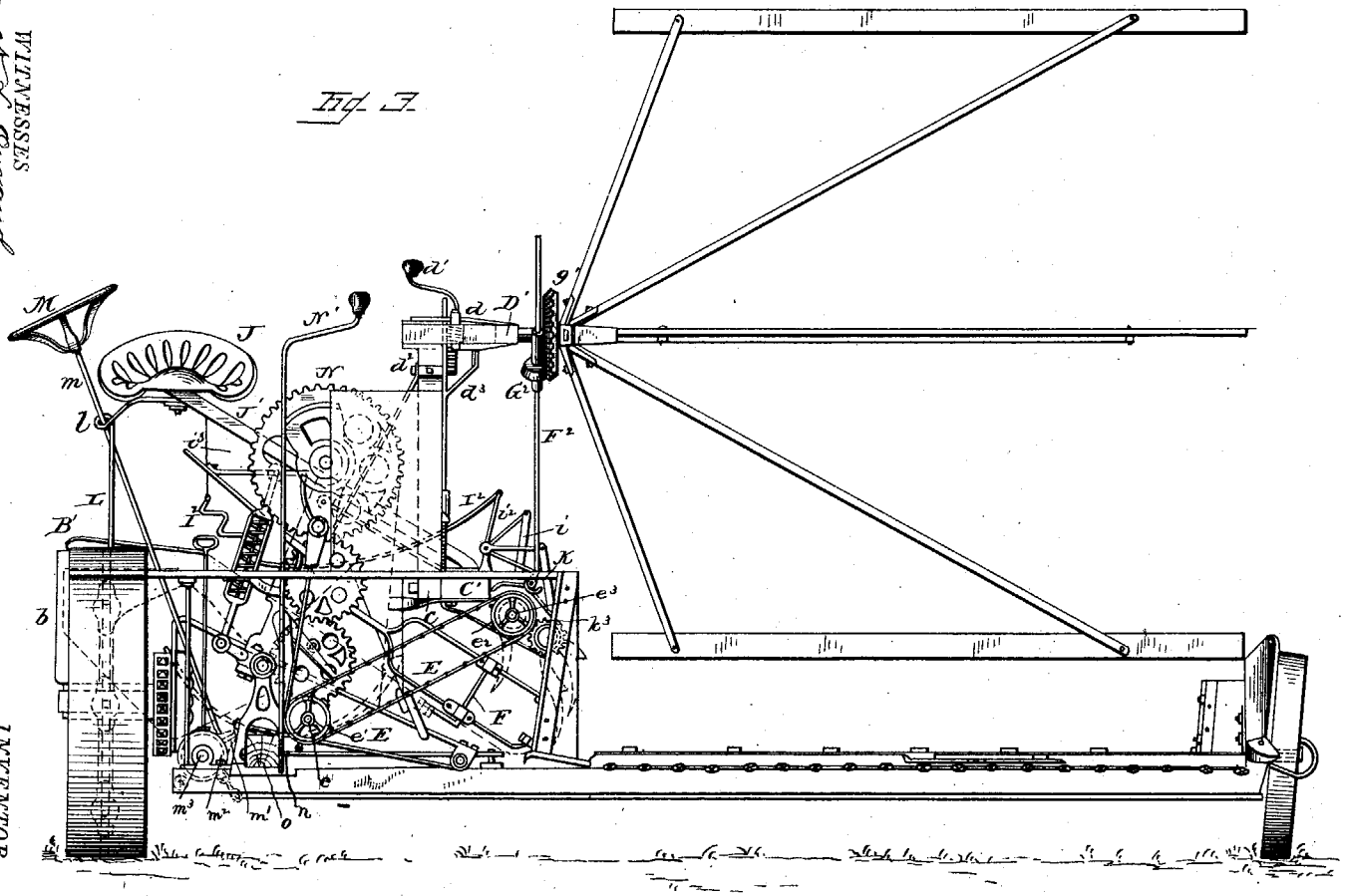
Figure 4:
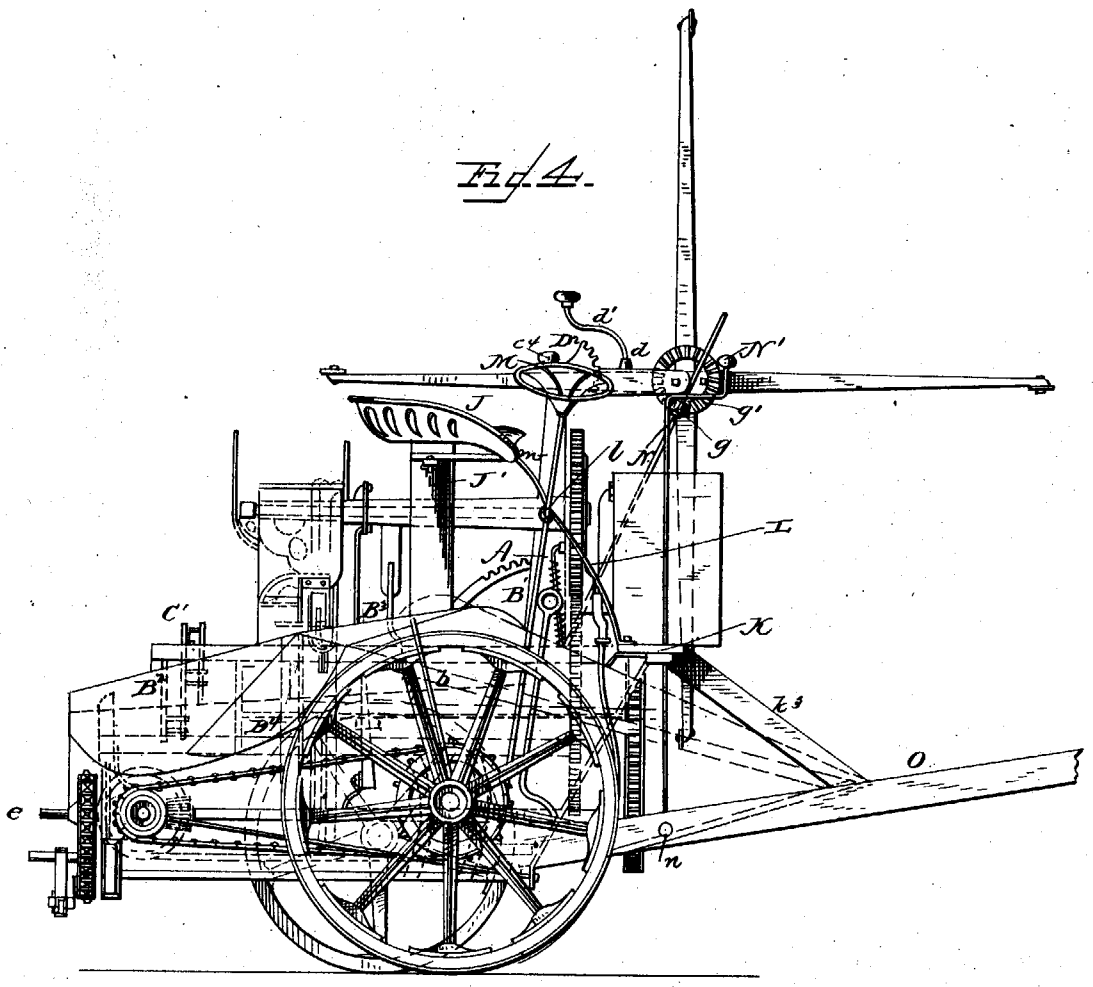
Figure 8:
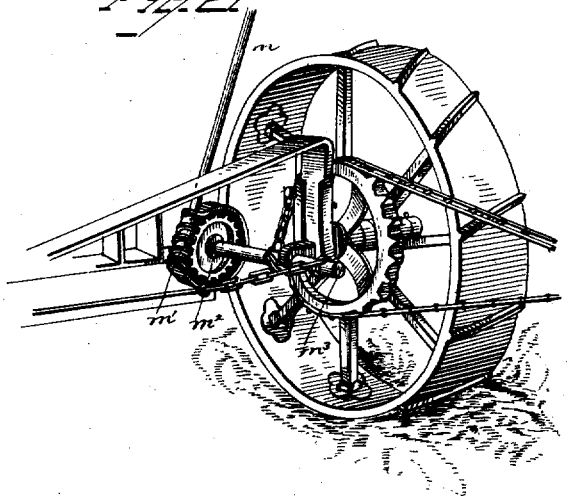
Figure 7:
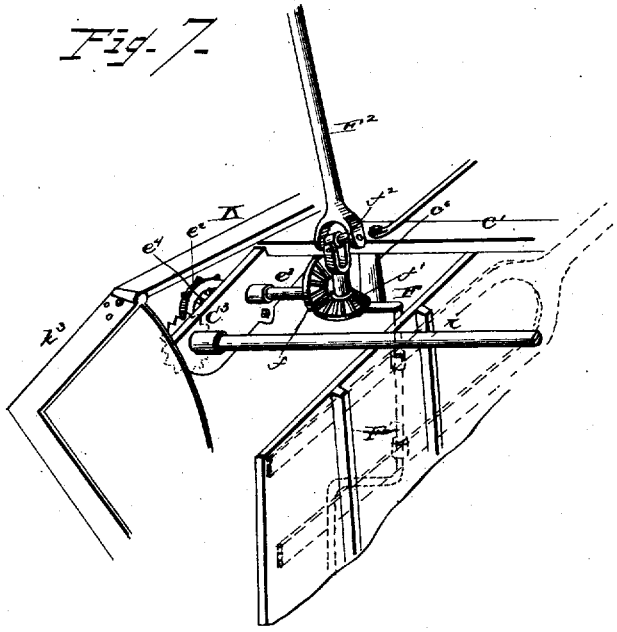
Figure 9:
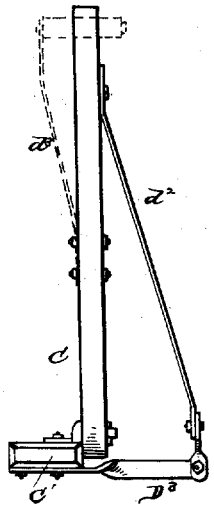
Figure 10:
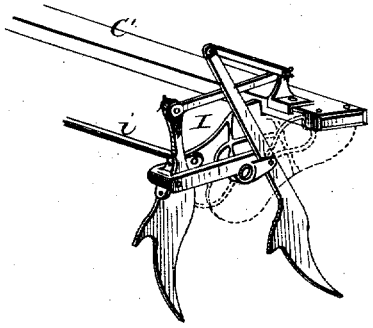
Figure 11:
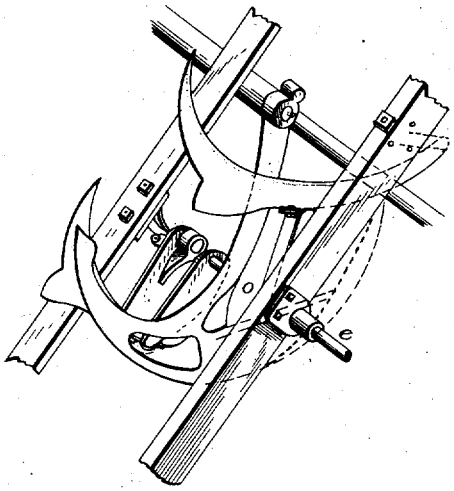
Figure 12:
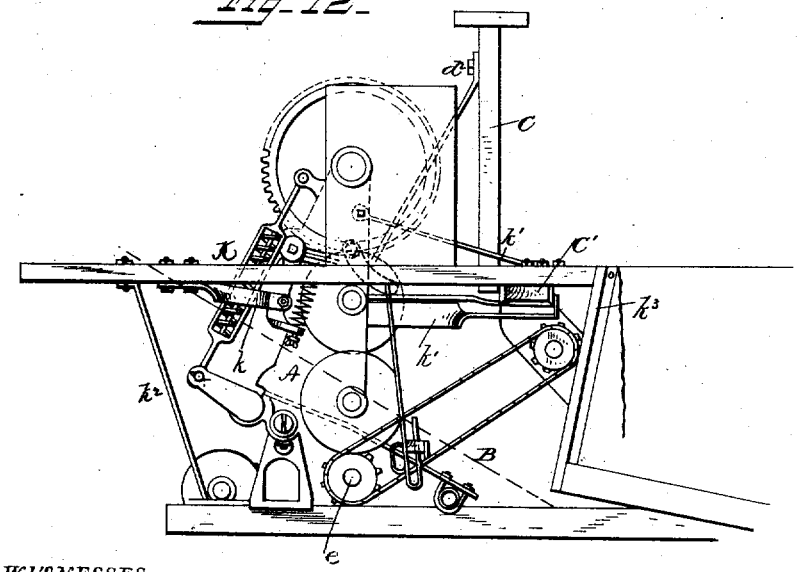

Figure 1 represents a plan or top view of a grain-binding harvester embracing my improvements; Fig. 2, a rear elevation, and Fig. 3 a front elevation thereof; Fig. 4, a view in elevation of the machine as seen from its stubble side, and Fig. 5 a similar view of its grain side. Figs. 6 and 7 represent detail perspective views of the reel-driving devices; Fig. 8, a similar view of the apparatus for raising and lowering the frame on the driving-wheel. Fig. 9 shows the way of bracing the reel-post. Fig. 10 shows the pickers in perspective. Fig. 11 shows a similar view of the binder-arms and packers; and Fig. 12 a front elevation of the frame, binder-gearing, and adjacent parts. Fig. 13 shows a view in perspective, as seen from the front and divider side of the machine, of portions of the frame, tongue, adjusting devices, driver's seat, and binder mechanism, showing clearly the organization of these parts.

My invention relates to a novel arrangement of the binder-table, its discharging-apron, and binder-gear standard relative to the main driving-wheel and the path of the grain in its passage over said wheel; to the construction of the portion of the binder-table or of the discharging-apron attachment thereto overhanging the driving-wheel, and to the manner of combining the same with the wheel, whereby it is automatically adjusted in its relation to said wheel to conform to the adjustment of the frame; to a novel arrangement of means for driving and for effecting the adjustment of the reel and of its driving mechanism; to a novel construction of the connecting-rod and of the endless chain driving the crank-shaft, whereby the said parts are made to assist in moving the grain; to a gravity-stop for preventing the backward movement of the grain on the elevating incline, and to a novel arrangement of mechanisms for actuating the sickle-bar, butting device, pickers, and reel, whereby said parts are all connected with and operated from the same binder-shaft, all as hereinafter explained.

The machine in its organization resembles that described in Letters Patent No. 276,449, granted to me April 24, 1883, and No. 290,459, granted to me December 18, 1883, and will not therefore be described in detail herein, except so far as is necessary to an understanding of the improvements herein claimed. Thus the construction of the main or binder and platform frames, the relation of said parts and of the inclined binder-table to the driving-wheel, and of the binding devices proper to said table, also the construction of the binder-gear standard or yoke *per se*, the construction of the main driving-wheel and grain-wheel, and the manner of connecting said wheels with the frame of the machine are features all fully set forth in the above-mentioned patents, and, except in particular features of arrangement hereinafter described, said parts are not herein claimed.

The binder-gear standard A, instead of being arranged in rear of the path of the grain in its passage from the inner end of the grain-platform over the driving-wheel, as described in the above-mentioned Patent No. 290,459, is arranged in advance of said path, with its tubular arms projecting from its rear face, said standard being secured to the forward transverse bar of the inclined binder-frame, this arrangement permitting a material reduction of the width of the grain-platform and the binder-table as compared with a machine in which the standard is arranged in rear of the path of the grain, and in which arrangement said standard must be set far enough back to accommodate the length of the longest straw, whereas in the present arrangement, the grain-platform and the binding-table being made of a width from front to rear sufficient to adapt it to the ordinary length of grain, where the machine is operating upon very tall grain or long straw, the heads may overhang the platform and binder-table, there being no obstructing support in its pathway. This arrangement of the binder-standard, in connection with the arrangement of the binding devices whereby the grain is bound during its passage and in the process of elevating it over the wheel, enables me to contract the machine within materially-reduced limits as compared with the ordinary arrangement of these parts.

The inclined binder-table upon which the grain is bound between the inner end of the grain-platform and the driving-wheel is provided at its upper end with a discharging apron or board forming a rigid lateral extension B′ at the forward part of said end. This lateral extension overhangs the driving-wheel and is contracted in width to its rear end, giving it a triangular form, its outer face or edge crossing the vertical plane of the driving-wheel obliquely, as shown. The rear portion of the upper end of the table B is cut away or deflected on a line forming an extension of the outer edge of the part B′, or thereabout, to receive or form a rigid lateral extension $B^2$, said extension $B^2$ overhanging the rear portion of the driving-wheel and the path of the same and being inclined downward for facilitating the discharge of the bundle.

To the outer end of the extension B′ is hinged a triangular-shaped plate or flap $B^3$, and to the rear end of this flap is hinged a second flap $B^4$, the rear end of the latter lapping over and resting upon the forward end of the inclined extension $B^2$. The outer ends or edges of the hinged portions $B^3$ $B^4$ project slightly beyond the outer face of the driving-wheel, and the flap or part $B^3$ is connected by a standard *b* with the outer end of the drive-wheel axle, which serves to uphold it at a uniform height above the drive-wheel. By this arrangement the portion of the extension overhanging the wheel at its highest point will be held clear of the wheel under any and all adjustments of the height of the main frame and cutting apparatus, and the discharging end of the hinged flaps or apron will always be held at the same height above the ground, the angle of relation thereof to the inclined elevating and binding table varying to accommodate the adjustment in height of the latter. The connection between the standard *b* and the hinged discharging-apron may be such as to adapt the latter to be adjusted in height, if desired, or the standard itself may be made in two parts—one adjustable upon the other—for the same purpose.

The reel-post C is connected by a transverse pivot at its lower end with the longitudinal supporting-bar C′ to permit the forward and backward adjustment of its upper end and of the reel connected therewith.

Figure 5:
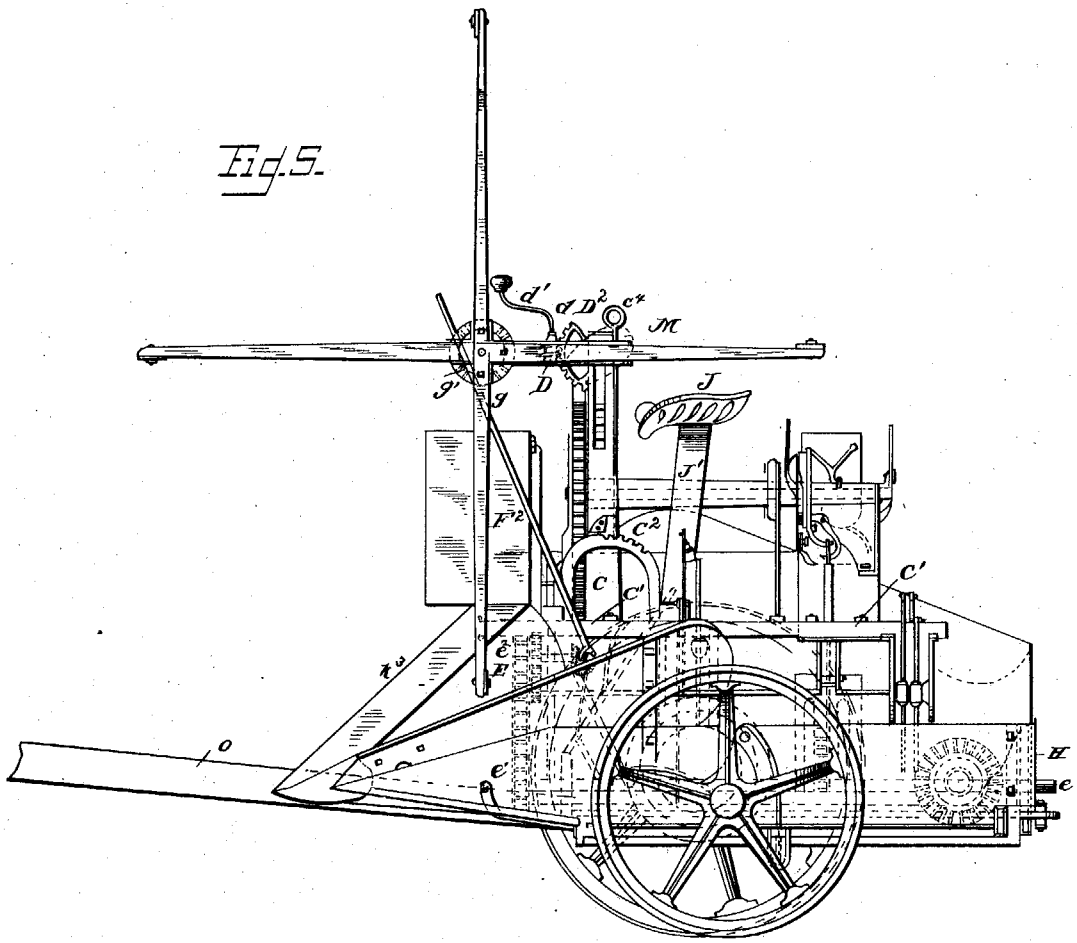
Figure 6:
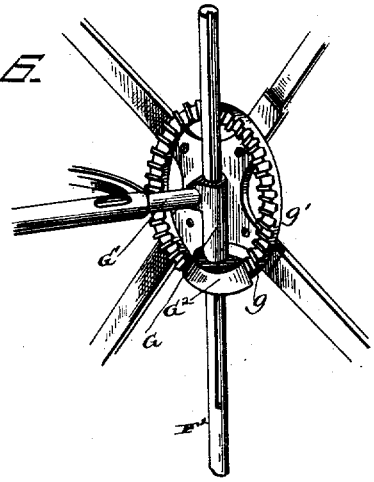

Upon the longitudinal supporting bar or plank C′ is secured a curved rack $C^2$, Fig. 5, and a weighted or spring latch moving in suitable ways on the reel-post is provided with a handle $c^4$, within convenient reach of the driver in his seat on the machine for enabling him to release the latch and adjust the reel-post and reel backward and forward, as desired.

To the upper end of the reel-post the rear end of a yoke or open loop-shaped bracket D, Fig. 1, is pivoted, said yoke being provided on its forward end with a sleeve D′, Fig. 3, in which the reel-shaft has its bearing.

Within the bracket D, to the upper end of the reel-post, is rigidly secured a forwardly-projecting quadrant-plate $D^2$, Fig. 5, toothed on its forward curved end, and in a cross-bar of the bracket D is mounted a short vertical shaft *d*, provided with a worm which engages with said quadrant-rack. The shaft *d* has a crank-arm *d′* on its upper end within convenient reach of the driver, who, by rotating the crank-arm, can adjust the forward swinging end of the bracket D for raising or lowering the reel, as desired.

The reel is of the type denominated an "overhung" reel, being supported at its inner end only, and for stiffening its support and preventing its sagging lateral braces $d^2$ $d^3$ are employed, the former (see Fig. 9) being pivoted at its lower end to a laterally-projecting arm or bracket $D^3$, secured to the longitudinal supporting-bar C′ and at its upper end bolted rigidly to the post C. The pivotal connection of the brace $d^2$ with the bracket $D^3$ is in line with the pivotal connection of the post C with the bar C′, and the brace thus arranged serves to prevent lateral swaying of the reel-post without interfering with its adjustment, as described. A similar brace (indicated at $d^3$ in dotted lines, Fig. 9) may extend from the post C up to one end of the pivot connecting the yoke or loop-bracket D with the post C, and said bracket can thus be given the required width of support necessary to prevent the sagging of the reel-shaft.

The arrangement of gearing for actuating the binding mechanism is the same as that described in Patent No. 290,459, above referred to, except that, the binder-gear standard being turned around and placed in front instead of in rear of the path of the grain, the gearing is correspondingly transposed.

The main binder-gear shaft *e* is provided on its forward end in advance of the spur-gear actuating the binding mechanism with a sprocket-wheel *e′*, from which motion is communicated through an endless chain E to a similar sprocket-wheel $e^2$ on the forward end of a short shaft $e^3$, mounted in a bracket or brackets $C^3$, secured to the bar C′. (See Figs. 3, 7, and 12.)

Upon the rear end of the shaft $e^3$ is secured a bevel-wheel *f*, which engages with and drives a similar wheel *f′*, secured to the upper end of the crank-shaft F, which actuates the butting-board F′ in a manner similar to that shown in Patent No. 290,459, above referred to. This crank-shaft F is arranged at right angles to the inclined face of the binder-table B, and is stepped at its lower end in a suitable bearing on the latter, and at its upper end has a bearing in an angular bracket $C^2$, secured to the longitudinal supporting-bar C′. To the upper end of said shaft is connected, by a universal joint $f^2$, a "tumbling" extension or shaft $F^2$, Figs. 6 and 7, extending upward beyond and in close proximity to the reel-shaft. The upper end of this shaft or extension $F^2$ slides in a pendent tubular bearing G, provided with a horizontal sleeve G′, surrounding the reel-shaft, the extension $F^2$ being grooved or feathered to adapt it to receive and drive a bevel-pinion $g$, mounted in a receptacle or socket-piece $G^2$, formed upon or secured to the lower end of the tubular bearing G, Fig. 6. The receptacle $G^2$ is open or cut away on its outer side to permit the teeth of the pinion $g$ to project on that side and engage with a bevel-wheel $g'$, secured to the spokes of the reel or to the reel-shaft adjacent thereto. By this arrangement of mechanism the reel is adapted to be driven in any of the various positions to which it may be adjusted, as above described, and from the same shaft which actuates the butting-board or by a tumbling extension thereof.

The rear end of the main binder gear-shaft $e$ is provided with a sprocket-wheel H, Fig. 2, which serves through a chain $h$ to drive a similar wheel H′, secured to the rear end of the inner roller of the platform-apron, and the latter wheel H′ is provided with a crank-wrist, from which a rod $h'$ extends outward, connecting said wrist with the rear end of a centrally-pivoted longitudinal lever $H^2$, Fig. 1, which at its forward end is connected with and serves to reciprocate the knife-bar.

The chain $h$ and the pitman $h'$, the latter on its upper face or edge, are provided with teeth or pins $h^2$ $h^3$, which on the upward and inward throw of the pitman and the inward movement of the chain on its upper side serve to assist in moving the grain inward and up the inclined binder-table B when the straw is of sufficient length to cause the heads to project beyond the rear edge of the platform-apron and binder-table, as suggested above.

The hangers or brackets I, attached to the longitudinal supporting-bar C′, and in which the picker-shaft $i$ (described in Patent No. 290,459, referred to) is mounted, have one or more curved bars extending inward over the inclined binder-table, and, being slightly curved and provided with ratchet-shaped teeth on their lower faces, allow the grain to readily pass by in its movement upward on the inclined binder-table, but effectually prevent its return or backward movement. The bar I′ at its inner free end rests by gravity upon the inclined binder-table or upon the ascending grain thereon, and forms what I term a "gravity-stop."

A second bar or rod $I^2$, Fig. 2, somewhat similar in form to the gravity-stop I′, is pivoted at its inner end to a heel-extension $i^2$ of one of the picker-links, connecting the heel end of the pickers $i'$, Fig. 10, with a pivot on the longitudinal supporting-bar C′, the outer end of the rod $I^2$, overhanging the upper end of the inclined binder-table, being held suspended somewhat above said table by a cord or pivoted link $i^3$, connecting it with the driver's seat or other suitable support. The rod or bar $I^2$ is vibrated in the direction of its length through its connections with the picker-link and serves to force the bundles after they leave the binding device up to the upper portion of the inclined binder-table and out upon the discharging-apron attachment thereto, above referred to.

The driver's seat J is secured to a supporting-standard J′, attached to and upheld by the binder-gear standard, as described in Patent No. 290,459, above referred to, except that said seat-standard instead of being secured to the upper bearing-sleeve only of said gear-standard, as therein described, extends transversely and obliquely underneath said sleeve, and has its lower end secured firmly to the longitudinal supporting-bar C′, and, being secured also to said sleeve, serves to materially stiffen the attachment of said bar C′ to the gear-standard. (See Fig. 13.) Directly in front of the binder-gear standard A is a horizontal transverse bar K, extending across the longitudinal plane of the driving-wheel and binding mechanisms in advance of said parts, said bar forming a driver's foot-board. It rests upon the forward end of the longitudinal supporting-bar C′, and is secured to the binder-gear standard A by angular or curved brackets $k$ $k'$, Fig. 12, which serve to uphold it in the position described and shown. An additional support $k^2$ is shown at its outer end in the form of an upwardly and outwardly inclined rod or bar provided with angular projections at its sides, bolted the lower one to the outer end of the forward transverse frame-bar and the upper one to said foot-board K. The end of the foot-board overhangs the shoe at the inner end of the cutting apparatus, and is connected with said shoe by a grain-deflecting board $k^3$, extending forward and downward to the point of said shoe, as shown.

A standard L, attached to the outer end of the foot-board K, extends upward and backward, and is connected at its upper end with the seat-support J′, serving to steady the latter. This rod or standard is bent or provided with a coil $l$ at or near the center of its length to form an eye or bearing for an inclined shaft $m$, or a bearing-bracket may be attached to the standard L for that purpose, thereby avoiding the bending of the rod to form such bearing, though the latter construction is preferred. The shaft $m$ is provided on its upper end with a hand-wheel M or a crank-arm for operating it, and upon its lower end with a worm or screw $m'$, engaging with a worm-wheel $m^2$ on a longitudinal shaft $m^3$, from which chains or chain and rods extend to the main driving-wheel and grain-lever for adjusting the height of the main frame, platform, and cutting apparatus, as described in Patent No. 276,449, referred to. (See Fig. 8.)

The foot-board K is also provided with a bearing for an upright shaft N, having on its lower end a screw-thread working in a nut $n$, having a shank swiveled in the tongue O in front of the pivotal connection $n'$ of said tongue with the frame. The shaft N is provided on its upper end with a hand-wheel or crank N′, which, like those for effecting the other adjustments of frame and reel above described, is within convenient reach of the driver in his seat, who, by rotating said shaft, can raise or depress the heel end of the tongue, and so rock the machine on its wheel for raising and depressing the cutters. (See Fig. 13.)

By the several arrangements of adjusting devices above described the height of the frame, its angle of inclination, as well as that of the platform and cutters, and the position of the reel are all placed under the control of the driver in his seat, and he is enabled to adapt the machine easily and quickly to the condition of the grain to be operated upon.

The short longitudinal shaft $e^3$, Fig. 7, above described, is provided in rear of the sprocket-wheel $e^2$ with a spur-wheel $e^4$, which engages with a similar wheel on the picker-shaft $i$, above referred to, for operating the same; or, if preferred, the main or first binder-shaft $e$, above described, may be provided with a second sprocket-wheel in close proximity with the wheel $e'$, and a chain extending thence around a sprocket-wheel on the picker shaft $i$ may be employed for driving the latter. Under either arrangement it will be seen from the foregoing description that the sickle-bar, the butting device, the pickers, and the reel are all connected with and driven from the same binder-shaft $e$. The particular form and arrangement of the pickers are described in Patent No. 290,459, above referred to.

Parts of the machine not herein particularly described will be constructed and arranged as described in said Patents Nos. 276,449 and 290,459, so far as they relate thereto; otherwise in any usual or preferred manner.

The combination and organization of many of the parts herein set forth are not claimed herein, as they constitute the subject-matter of another division hereof, Serial No. 128,760, filed simultaneously herewith and patented of even date.

Having thus fully described the organization and operation of my improved grain-binding harvester, what I claim herein as new and of my own invention, and desire to secure by Letters Patent, is—

1. The inclined binder-table located between the grain-platform and the driving-wheel and provided with an apron overhanging the latter, in combination with the binder-gear standard located on the grain side of said wheel in advance of the path of the grain in being elevated over the same, substantially as described.

2. The combination, with the inclined elevating and binding table located on the grain side of the driving-wheel, of a discharging-apron overhanging said wheel and having one or more hinged sections, substantially as and for the purpose described.

3. The inclined elevating and binding table provided with a discharging-apron overhanging the driving-wheel and having one or more hinged sections, in combination with a supporting-standard connecting the latter with the outer end of the drive-wheel axle, substantially as described.

4. In a self-binding harvester, the combination, with the platform-carrier, of the inclined elevating binder-table on the grain side of the path of the driving-wheel, provided with the oblique outer edge extending across and over the path of the driving-wheel, substantially as described.

5. In a self-binding harvester, the binder-table provided with the oblique outer edge, in combination with a delivery flap or apron inclining downward and rearwardly, substantially as described.

6. In a harvesting-machine having an inclined elevating binder-table interposed between the grain-platform and the driving-wheel, and in combination with said table, mechanism for binding the grain in its passage over the table, a reel-post connected with a support arranged above said table and attached to the gear-standard, and a butting device arranged between said reel-support and inclined binder-table.

7. The combination, with the adjustable reel, of the tumbling-shaft for operating it, connected by a universal joint with and forming an extension of the crank-shaft-actuating butting devices, substantially as described.

8. The combination, with the inclined elevating binder-table interposed between the grain-platform and the driving-wheel, of the pivoted gravity-stop provided with ratchet-shaped teeth on its lower face, substantially as described.

9. The inclined binder-table located on the grain side of the driving-wheel and provided at its upper end with the apron overhanging said wheel, in combination with mechanism for binding the grain on said table and a bundle-discharger suspended above said table and connected with and operated from the picker-link, substantially as described.

10. The pitman for actuating the sickle-bar, in combination with a sprocket-chain actuating the crank-shaft and inner roller of the platform-apron, both pitman and chain being provided with teeth to assist in moving the heads of the grain overhanging the inclined binder-table, substantially as described.

11. The combination, with the crank-shaft actuating the butting-board, the tumbling extension of said shaft actuating the reel, the picker-shaft, and the mechanism for actuating the sickle-bar, of the main binder-gear shaft, substantially as described, whereby said butting-board, reel, picker-shaft, and sickle-bar are all driven from one and the same binder-shaft.

In testimony whereof I have hereunto set my hand this 11th day of April, A. D. 1884.

LEWIS MILLER.

Witnesses:
O. L. SADLER,
N. A. MEANS.